United States Patent
Greenslade

[11] Patent Number: 5,985,127
[45] Date of Patent: Nov. 16, 1999

[54] METHOD OF AND APPARATUS FOR REMOVING A METALLIC EROSION SHIELD FROM ATTACHMENT TO A HELICOPTER ROTOR BLADE

[75] Inventor: Richard David Greenslade, Dorset, United Kingdom

[73] Assignee: GKN Westland Helicopters Limited, Yeovil, United Kingdom

[21] Appl. No.: 09/007,045

[22] Filed: Jan. 14, 1998

[30] Foreign Application Priority Data

Jan. 16, 1997 [GB] United Kingdom ................... 9700819

[51] Int. Cl.[6] .................................. C25F 5/00; C25F 7/00
[52] U.S. Cl. .......................... 205/666; 205/686; 205/717; 204/224 M; 204/225
[58] Field of Search ..................................... 205/717, 640, 205/686, 666; 204/224 M, 225

[56] References Cited

U.S. PATENT DOCUMENTS

| | | |
|---|---|---|
| 3,689,387 | 9/1972 | Jumer . |
| 4,128,463 | 12/1978 | Formanik ............................. 205/717 |
| 4,142,954 | 3/1979 | Lucas . |
| 4,234,397 | 11/1980 | Torrey . |
| 4,246,083 | 1/1981 | Notton . |
| 4,261,804 | 4/1981 | McGivern, Jr. . |
| 4,539,087 | 9/1985 | Pojbics et al. ............................. 205/717 |
| 4,720,332 | 1/1988 | Coffey . |
| 4,894,130 | 1/1990 | Sova . |
| 5,062,931 | 11/1991 | Sue .......................................... 205/717 |
| 5,062,941 | 11/1991 | Sue . |

FOREIGN PATENT DOCUMENTS

| | | |
|---|---|---|
| 0318886 | 7/1989 | European Pat. Off. . |
| 0 482 565 A2 | 4/1992 | European Pat. Off. . |
| 670542 | 4/1952 | United Kingdom . |
| 20 155 75 | 12/1979 | United Kingdom . |
| 2 104 919 | 3/1983 | United Kingdom . |

*Primary Examiner*—Donald R. Valentin
*Attorney, Agent, or Firm*—Larson & Taylor

[57] ABSTRACT

A method of removing a metallic erosion shield secured by a layer of non-metallic adhesive to a leading edge structure of a helicopter rotor blade comprising, the step of providing an electric field between the metallic component and an electrode, in the presence of an electrolyte between the metallic component and the electrode whereby the erosion shield is removed by an electrochemical process.

14 Claims, 3 Drawing Sheets

METHOD OF AND APPARATUS FOR REMOVING A METALLIC EROSION SHIELD FROM ATTACHMENT TO A HELICOPTER ROTOR BLADE

BACKGROUND OF INVENTION

This invention relates to a method of and apparatus for removing a metallic erosion shield from attachment to a helicopter rotor blade.

A helicopter rotor blade whether made of composite and/or metallic material, is conventionally provided with an erosion shield which extends around the leading edge of the blade throughout at least part of a blade span, to protect the blade leading edge structure from erosion in use, as the blade moves through the air. Such erosion shields are made of titanium or like metallic material, and are usually attached to the composite blade by means of a layer of adhesive.

Such erosion shields tend to wear out and require replacement during the life of the blade. It is thus necessary to remove a worn out erosion shield in order to replace it. The conventional method of removing a worn shield is to split the shield along the leading edge of the blade and literally wind back the two portions from the split line, using a manual and skillful technique.

SUMMARY OF THE INVENTION

According to a first aspect of the invention we provide a method of removing a metallic erosion shield secured by a layer of non-metallic adhesive to a leading edge structure of a helicopter rotor blade characterised in that the method comprises the step of providing all electric field between the erosion shield and an electrode, in the presence of an electrolyte between the erosion shield and the electrode whereby the erosion shield is removed by all electrochemical process.

By utilising such a method, an erosion shield can be removed from the surface of a helicopter rotor blade without any risk of damage to the underlying structure because the process is essentially self controlling, in that when the electrochemical process reaches the adhesive layer, the process naturally ceases due to the adhesive being inert to the electrolyte. This will be so even where the underlying structure is metallic in nature because the adhesive layer will cover and thus protect such metallic underlying structure from the electrochemical process.

Of course, the adhesive layer can subsequently be removed using a suitable solvent to which the underlying structure is inert.

Whereas it is usual in performing any electrochemical treatment on a component for that component to be immersed in the electrolyte, in the case of a helicopter rotor blade this is likely to be impractical. Hence preferably in performance of the method, the electrode is moved relative to the blade such that the erosion shield is removed from the blade over a pall of the blade larger than the relevant dimension of the electrode. For examples the electrode may be moved spanwise along the blade and usually, because in the case of a helicopter main sustaining rotor, the blade twists about a feathering axis, around the blade span axis too.

In one arrangement the electrode may be moved continuously in use in which case it may be necessary for electrolyte to be supplied between the electrode and the erosion shield as the electrode moves.

However if desired the electrode may be moved relative to the blade in stages such that the erosion shield is removed at a first discrete position and subsequently at a second discrete position.

Because the erosion shield tends to wear more quickly along a radially outer part of the blade than an inner part of the blade because of the greater rotational speed, it is possible in performing the present invention selectively to remove a part of the erosion shield along the blade span so that a part only of the erosion shield may be replaced.

According to a second aspect of the invention we provide an apparatus for performing the method of the first aspect of the invention characterised in that means are provided to move the electrode relative to the blade at least spanwise along the blade.

The means by which the electrode is moveable relative to the blade, may be adapted in addition to move the electrode about the blade span axis, particularly but not exclusively where the erosion shield is provided along a leading edge of the blade.

The electrode may be shaped to conform generally to the leading edge of the blade but may still be moveable about the blade span axis.

BRIEF DESCRIPTION OF THE DRAWINGS

The invention will now be described with reference to the accompanying drawings in which.

DESCRIPTION OF THE PREFERRED EMBODIMENTS

Figure 1:
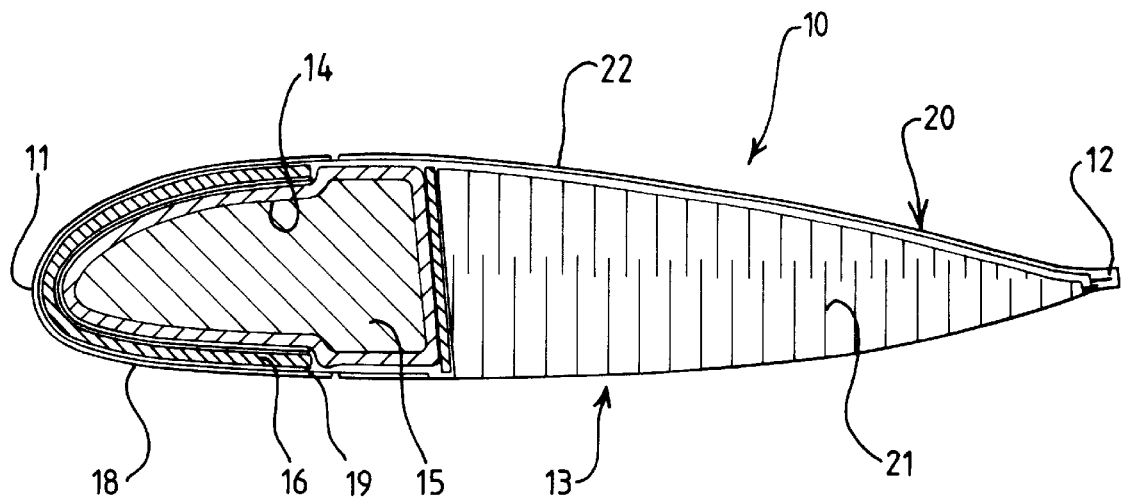
FIG. 1 is all illustrative sectional view through a helicopter blade on which the method of the invention may be performed.

Referring to FIG. 1 of the drawings there is shown a helicopter blade 10 being an aerofoil comprising a leading edge 11 and a trailing edge 12. The blade 10 comprises a body 13 made of non-metallic materials. The body 13 has in this example a leading edge spar 14 comprising composite material, with a foamed filler 15. Around a part of the leading edge spar 14 and throughout at least part of the span of the blade there is provided a heater mat 16 which in use, is energised to prevent icing of the blade 10, and adhered to the heater mat 16 is an erosion shield 18 which typically is made of titanium or another metallic material. The heater mat 16 is covered with a thin layer of adhesive typically of 0.010" thickness (0.025cm) which is shown in the drawings at 19, which thus bonds the erosion shield 18 to the underlying structure of the heater mat 16 and the composite material of the leading edge spar 14.

A trailing portion 20 of the blade body 13 comprises a honeycomb structure 21, with a covering of trailing edge skin 22.

Figure 2:
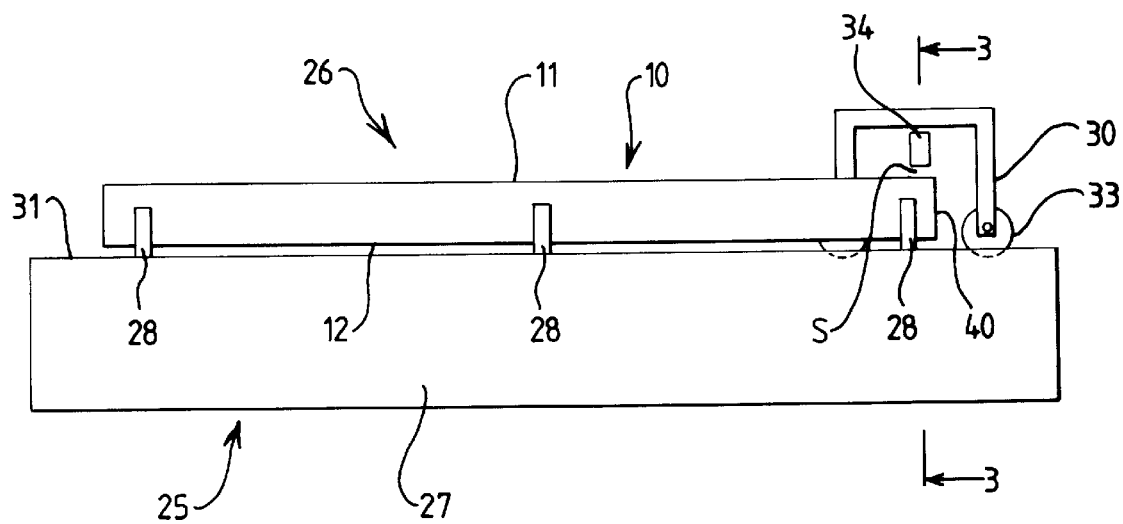
FIG. 2 is a side diagrammatic view of an apparatus for use in performing the method of the invention.
Figure 4:
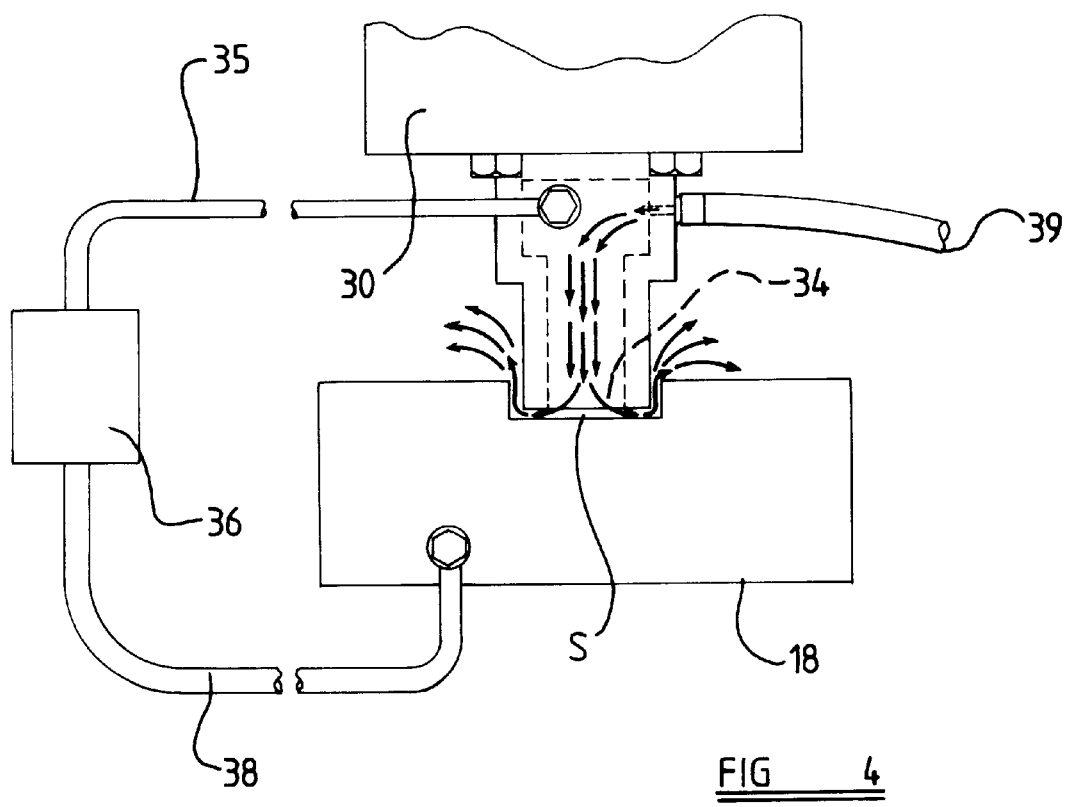
FIG. 4 is an illustrative view of all electrochemical machining apparatus.

Referring now also to FIGS. 2 and 4, when it is desired to remove the erosion shield 18, in the method in accordance with the invention, the blade 10 is placed in a jig 25 of an electrochemical machining apparatus 26 comprising a base 27 having a plurality of blade supports 28. The apparatus 26 includes a gantry 30 which is movable along the span of the blade 10. The gantry 30 rides along a track surface 31 of the base 27 on a wheeled structure 33 and carries an electrode 34 which is connected electrically via a conductor 35, to the negative pole of a power supply 36 and may be made of e.g. copper or any other suitable conducting material. The gantry 30 is arranged so that during such movement of the gantry 30, the spacing between the electrode 34 and the erosion shield 18 remains constant.

Also, the electrode 34 is movable laterally of the span of the blade 10, on an arcuate track 37, around the span axis A of the blade 10, so that the electrode 34 may be moved around the leading edge 11 of the blade 10, again at a predetermined constant spacing from the erosion shield 18.

The titanium erosion shield 18 is connected via a conductor 38 to the positive pole of the power supply 36 so that there is an electric field between the electrode 34 and the erosion shield 18. An electrolyte is fed from an electrolyte supply 39 under pressure into a space S between the electrode 34 and the erosion shield 18, for example through holes in the electrode 34, and thus the erosion shield 18 will be electrochemically removed. The gantry 30 typically is moved from one, outer, end 40 of the blade 10 towards the other to remove any desired extent of the erosion shield 18, and such movement may be accomplished either in stages such that the erosion shield 18 is removed at a first discrete position and subsequently at a second discrete position, or continuously as desired.

Also, the electrode 34 is moved about the span axis A either in stages or continuously, so that the erosion shield 18 around the entire leading edge 11 of the blade 10 may be removed. Thus by virtue of the electrode 34 being movable relative to the erosion shield 18, it will be appreciated that the electrode 34 may be used to remove erosion shield over an area greater than the relevant areal extent of the electrode 34.

The electrochemical process will not remove the non-metallic layer of adhesive 19 because it is inert to the electrolyte thereby effectively providing a barrier against further action by the electrochemical process so as to facilitate removal of the metallic erosion shield 18 without risk of damaging the underlying heater mat 16. The layer of adhesive may subsequently be removed using a suitable solvent, without risk of damaging the heater mat 16 or any other part of the structure underlying the erosion shield 10.

It will be appreciated that in performance of the method of the invention utilizing an electrochemical machining method, the electrode 34 does not actually contact the erosion shield 18, and so there is no friction or wear, and little heat is generated with little risk of sparking.

Preferably as an added safeguard in the described embodiment, the electrolyte may be of any suitable kind which is also chemically inert to the composite material of the blade 10 and particularly to the composite material surrounding the heater mat 16 thereby reinforcing the inert barrier provided by the adhesive layer 19. Preferably the electrolyte is selected to avoid unwanted plating of the electrode.

Various modifications may be made without departing from the scope of the invention.

Figure 5:
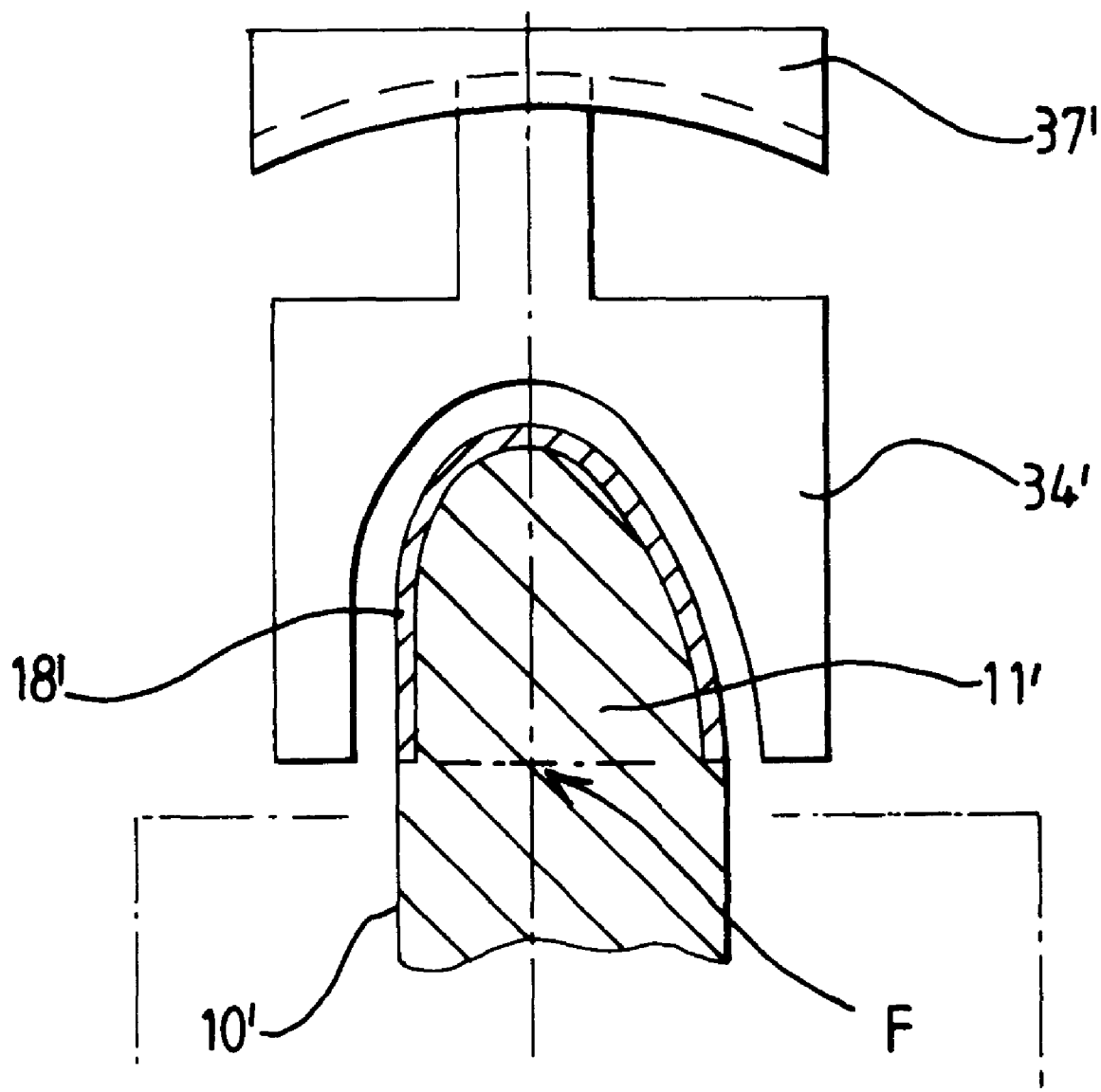
FIG. 5 is a view similar to FIG. 3 but showing an alternative apparatus for use of performing the method of the invention.

For example, instead of the electrode 34 being movable around the leading edge 11 of the blade 10 so that the erosion shield 18 may be removed around all or substantially all of the leading edge spar 14, the electrode 34 may be specially shaped to conform generally to the shape of the leading edge 11 of the blade 10 as described with reference to FIG. 5 below. Thus the arcuate track 37 may not be required although in the case of a main sustaining helicopter rotor blade which twists about a feathering axis, means would need to be provided to enable the electrode to move about at least the feathering axis to accommodate such twists. Instead of an actuator 31 to move the gantry 30 along the blade 10, for example as described below and as shown in FIG. 5, any other desired drive means, such as a motor/gear/belt drive may be employed.

If desired, instead of feeding electrolyte into the space S between the electrode 34 and the erosion shield 18, the blade 10 may be immersed in a bath of electrolyte, at least to an extent that the erosion shield or part thereof it is desired to remove, is immersed in electrolyte.

Although in the method described the helicopter rotor blade 10 has been described as being made of non-metallic composite material, the invention could be used to remove a metallic erosion shield from a metallic blade or a metallic/composite rotor blade, if desired, although careful control of the electrochemical machining technique would be required to ensure avoidance of damage to the underlying structure of the blade.

However the layer of inert adhesive below the erosion shield would of course protect the underlying metallic structure.

The invention is of course not only applicable where there is a heater mat on the surface of the blade.

Figure 3:
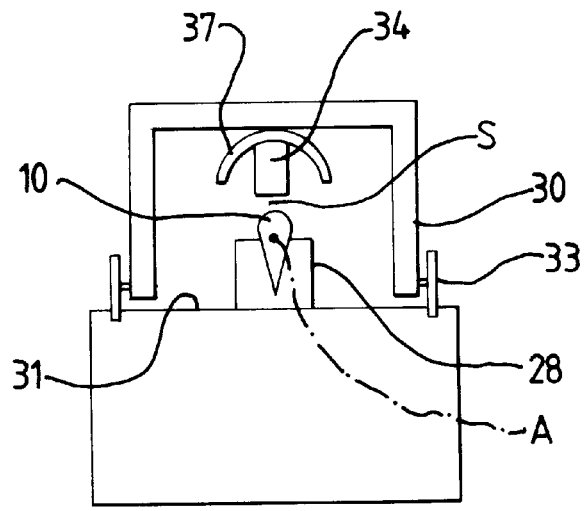
FIG. 3 is a sectional view of the apparatus of FIG. 2 on the line A—A.

Referring now to FIG. 5, there is shown an alternative apparatus for performing the invention in which similar parts to the apparatus shown in FIGS. 2 to 4 are indicated by the same reference numerals with a prime sign added.

In this arrangement, the electrode 34' is shaped generally to conform to the shape of the leading edge structure 11' of the helicopter rotor blade 10'. In this example, the helicopter rotor blade 10' is a main sustaining rotor for a helicopter which in use, is moved about a feathering axis which is indicated in the drawing at F.

A metallic erosion shield 18', is removed as the shaped electrode 34' is moved along the span of the blade 10'. To accommodate any twist of the blade 10' about the feathering axis F, the electrode 34' is carried on an arcuate track 37a' although any other means for allowing the shaped electrode 34' to move around the blade span axis to accommodate the twist of the blade, could alternatively be provided.

Otherwise the method carried out using the apparatus shown in FIG. 5 is essentially the same as the method described with reference to FIGS. 2 to 4.

I claim:

1. A method of removing a metallic erosion shield secured by a layer of non-metallic adhesive to a leading edge structure of a helicopter rotor blade, the method comprising the step of providing an electric field between the erosion shield and an electrode, in the presence of an electrolyte between the erosion shield and the electrode wherein the erosion shield is removed by an electrochemical process.

2. A method according to claim 1 wherein the electrochemical process is self controlling in that the electrochemical process ceases when the non-metallic adhesive layer is reached.

3. A method according to claim 1 wherein the helicopter blade is made of a non-metallic material.

4. A method according to claim 1 wherein in performance of the method, the electrode is moved relative to the blade such that the metallic erosion shield is removed from the blade over a part of the blade larger than the relevant dimension of the electrode.

5. A method according to claim 4 wherein the electrode is moved continuously during the electrochemical process.

6. A method according to claim 5 wherein the electrolyte is supplied between the electrode and the erosion shield as the electrode moves.

7. A method according to claim 5 wherein the blade is immersed in the electrolyte to an extent sufficient that the erosion shield is immersed in the electrolyte.

8. A method according to claim 4 wherein the electrode is moved relative to the blade in stages such that the erosion shield is removed at a first discrete position and subsequently at a second discrete position.

9. A method according to claim 4 wherein the electrode is moved spanwise of the blade.

10. A method according to claim 1 wherein the electrode is shaped to conform generally to the leading edge of the blade.

11. A method according to claim 1 wherein the electrode is moveable about a blade span axis.

12. An apparatus for performing a method of removing a metallic erosion shield secured by a layer of non-metallic adhesive to a leading edge structure of a helicopter rotor blade, said method comprising the step of providing an electric field between the erosion shield and an electrode, in the presence of an electrolyte between the erosion shield and the electrode, wherein the erosion shield is removed by an electrochemical process, said apparatus comprising means for moving the electrode relative to the blade at least spanwise along the blade.

13. An apparatus according to claim 12 wherein the means for moving the electrode relative to the blade moves the electrode about the blade span axis.

14. An apparatus according to claim 12 wherein the erosion shield is provided along a leading edge of the blade and the electrode is shaped to conform generally to the leading edge of the blade.

* * * * *